United States Patent [19]

Adams et al.

[11] 4,172,783

[45] Oct. 30, 1979

[54] CONDENSATE PURIFICATION PROCESS BY USE OF DILUTE CLEAR LIME SOLUTION

[75] Inventors: Ralph C. Adams, Somers Point; William S. Miller, Franklin Park, both of N.J.

[73] Assignee: The Permutit Company, Inc., Paramus, N.J.

[21] Appl. No.: 886,670

[22] Filed: Mar. 15, 1978

Related U.S. Application Data

[63] Continuation-in-part of Ser. No. 758,603, Jan. 12, 1977, abandoned.

[51] Int. Cl.² .............................................. B01D 15/06
[52] U.S. Cl. .......................................... 210/34; 521/26
[58] Field of Search ............... 210/24, 30 R, 32, 34, 210/35, 37 R; 423/157, 170, 636–640; 521/26

[56] References Cited

U.S. PATENT DOCUMENTS

| | | | |
|---|---|---|---|
| 2,606,098 | 8/1952 | Bauman | 210/37 R |
| 2,917,368 | 12/1959 | Juda | 210/24 |
| 3,013,861 | 12/1961 | Franz | 210/37 R |
| 3,501,401 | 3/1970 | Calmon | 210/35 |
| 3,709,818 | 1/1973 | Gustafson et al. | 210/32 |

*Primary Examiner*—Charles N. Hart
*Assistant Examiner*—Ivars Cintins
*Attorney, Agent, or Firm*—Omri M. Behr

[57] ABSTRACT

There is provided an improvement in the method of regenerating the anion portion of a mixed anion/cation exchange resin bed used for purification of condensate water. The improvement comprises utilizing a clear dilute lime solution substantially free of non-hydroxylic anions. This solution is produced by passing a solution of calcium salt through a strong base anion exchanger in the hydroxyl form, and thus producing calcium hydroxide by salt splitting. The spent resin is regenerated with spent caustic regenerant from a condensate purification process or with fresh caustic. It is preferred that the calcium solution and the regenerant enter the ion exchanger in counterflow pattern to minimize leakage of non-hydroxy ions.

7 Claims, No Drawings

CONDENSATE PURIFICATION PROCESS BY USE OF DILUTE CLEAR LIME SOLUTION

RELATED APPLICATIONS

This application is a continuation in part of our application Ser. No. 758,603 filed Jan. 12, 1977, now abandoned.

BACKGROUND OF THE INVENTION

U.S. Pat. Nos. 3,501,401 and 3,709,818 describe a method of regeneration of the anion exchange resin portion of a mixed bed condensate demineralizer with caustic followed by contacting the anion exchange resin bed with a calcium hydroxide solution. This substantially reduces sodium ion leakage into condensate water effluent due to replacement of sodium ions from cation exchange resin particles entrained in the anion exchange resin on separation of the mixed bed. This invention requires the use of sufficiently pure and clear dilute calcium hydroxide solution free of suspended solids, which is extremely difficult to prepare due to the impurities present in commercially available lime. These impurities may be either dirt, sand, and other particulate matter, or calcium carbonate formed during storage due to adsorption of carbon dioxide from the atmosphere. If a clear lime solution is to be made from commercially available hydrated lime, one must filter the final dilute lime solution. However, filtering has not been always effective due to either the impurities being colloidal in nature or so excessive as to cause plugging of the filter media in a very short time. The filters on occasion have allowed some insolubles to pass through, thus contaminating the ion exchange resin.

SUMMARY OF THE INVENTION

It is an object of this invention to provide a source of fresh, dilute, clear lime solution for the condensate purification processes of U.S. Pat. Nos. 3,501,401 and 3,709,818.

According to the invention, clear calcium hydroxide solution substantially free of anions other than hydroxide is produced by passing a soluble calcium salt solution through a salt splitting ion exchange resin, preferably one strong base anion resin of substantially uniform basicity. This avoids the problems caused by impurities in commercially available lime.

It is a further object of this invention to provide an economical method of regenerating said spent salt splitting ion exchange resin. This is accomplished by using spent caustic from the condensate purification processes of U.S. Pat. Nos. 3,501,401 and 3,709.818.

It is another object of this invention to provide a method of regenerating a salt splitting ion exchange resin that minimizes leakage. This is accomplished by introducing the influent solution and the regenerant in counterflow pattern.

The invention will be better understood and additional objects thereof will become more apparent from the accompanying specification and claims.

DETAILED DESCRIPTION OF THE INVENTION

U.S. Pat. Nos. 3,501,401 and 3,709,818 describe a condensate purification process involving the flow of condensate through a demineralizer containing a mixed bed of anion and cation exchange resin thereby to effect the removal of anions and cations from said condensate. The mixed bed is regenerated whereby sodium leakage therefrom is substantially reduced by resolving said mixed bed into a first layer, a major portion of which contains anion exchange resin particles and a minor portion of which contains entrained cation exchange resin particles, and a second layer containing cation exchange resin particles. The first layer is contacted first with caustic solution to effect the regeneration thereof and then with lime solution to displace sodium ions with calcium ions on said entrained cation exchange resin particles. The second layer is contacted with acid to effect the regeneration thereof, removing excess acid from said second layer and the said first layer and second layer are mixed to form the mixed bed.

According to the present invention, the impurity-free and clear lime solution for use in the above process is prepared by passing a dilute solution of soluble calcium salt through a strong base anion exchanger in the hydroxyl form, thus producing calcium hydroxide by salt splitting. It is especially preferred to utilize a resin bed of substantially uniform basicity. Though any soluble calcium salt solution could be used, the solutions of calcium chloride, calcium sulfate and calcium nitrate are preferred. The spent strong base anion resin is regenerated to remove the chlorides, sulfates or nitrates by simply using the caustic soda used for the regeneration of the mixed bed anion resin (U.S. Pat. Nos. 3,501,401 and 3,709,818), passing the regenerant first through the anion regenerator and then through the salt splitting unit. Since a very substantial excess of caustic is used to regenerate the mixed bed anion resin in the condensate purification process (U.S. Pat. Nos. 3,501,401 and 3,709,818) there is ample spent caustic available to regenerate the salt splitting resin. Thus, the system is economical as no additional chemicals are required for regeneration, though fresh caustic may equally well be used. It is usually preferable to discard 33% of the initial, spent caustic regenerant from the primary condensate purfication process as it contains silica and other salts.

The calcium requirements for the process are as follows. In the condensate anion regeneration unit the separated anion layer typically contains 80 cu. ft. of anion resin and 4 cu. ft. of cation resin. The 4 cu. ft. of cation resin entrapped in the anion unit is to be regenerated to Ca form. Theoretical capacity of strong acid resin equal 44 Kilograins/cu. ft. as $CaCO_3$.

Assuming 50% over stoichiometry, the Ca required to convert 4 cu. ft. of cation resin to calcium form would be 4 cu. ft. $\times$ 44 Kgr $\times$ 1.5 = 264 Kgr. Pounds of $CaCl_2$ required to produce 264 Kgr of calcium would be 264 Kgr $\times$ (1 lb/7 Kgr $\times$ 1.11 conv. factor = 41,86 lbs.

The amount of strong base anion resin required in the salt splitter is as follows based on 6 Kgr/cu. ft. operating capacity: 264 Kgr $\times$ (1 cu.ft./6 Kgr.) = 44 cu. ft.

The primary condensate purification unit containing 80 cu. ft. of anion resin is typically regenerated with 640 lbs. of NaOH at 8 lbs/cu. ft. 67% of 640 lbs of NaOH is available for the salt splitting resin regeneration. The regenerant for 44 cu. ft. of strong base anion resin used as the salt splitter would be:

$$\frac{640 \text{ lbs} \times 0.67}{44 \text{ cu. ft.}} = 9.74 \text{ lbs/cu. ft.}$$

The following examples are by way of illustration of a preferred embodiment of this invention and it is not intended that the invention be limited to the details therein set forth.

A strong base anion resin of substantially uniform basicity is preferably used as the salt splitting exchanger. In the following examples, Permutit Company's S-100 (Reg. TM) and Dow Chemicals Dowex SBR (Reg. TM) were used. S-100 resin is a cross-linked copolymer of styrene with ethylene gylcol dimethacrylate in $Cl^-$ and $SO_4^=$ form and Dow's SBR is a cross-linked copolymer of styrene with divinylbenzene in Cl form. The resins initially are contacted with NaOH to convert them to hydroxide form.

EXAMPLE 1

The following test criteria were established for the experiment:

| | |
|---|---|
| Strong base anion resin | Permutit S-100 (Reg. TM of Permutit) |
| Bed Depth (Cl form) | 48" (18.9 cm) |
| Sevice flow rate | 3 gpm/ft$^2$ (7.3m$^3$/hr/m$^2$ |
| Influent | 900 ppm CaCl$_2$ as Ca Cl$_2$ |
| Desired effluent | 600 ppm Ca(OH)$_2$ as Ca (OH)$_2$ |
| Service endpoint | 6 Kgr/ft$^3$ (0.275 eq/l) |
| Regenerant | 11.9# NaOH/ft$^3$ (190.6 grams/l) |
| Regeneramt Strength | 4% |
| Regenerant Flow Rate | 2.6 gpm/ft$^2$ (6.4 m$^3$hr/m$^2$) |

Calcium chloride solution was passed coflow through the hydroxide form strong base resin. The chloride leakage was 26 ppm $Cl^-$ under these conditions for Permutit S-100. Dowex SBR-P (Reg. TM of Dow Chemical) was also tested and leakage was 37 ppm $Cl^-$. A system of counterflow regeneration and operation of the anion resin bed was also tested. Upflow service and downflow regeneration was used, although in practicing this invention a downflow service and upflow regeneration should perform equally well. At 11.9# NaOH/ft$^3$ (190.6 g/l) chloride leakage was 1 ppm $Cl^-$ for S-100 if taken to a 6 Kgr/ft$^3$ (0.275 eq/l) endpoint. Chloride leakage increased to 2 ppm $Cl^-$ when regenerated with 5# NaOH/ft$^3$ (80 g/l). Counterflow regeneration of Dowex SBR-P resin (Reg. TM of Dow Chemical) also produced 2 ppm $Cl^-$ leakage at 5# NaOH/ft$^3$ dosage.

The results may be summarized as follows:

| Resin | Regeneration Caustic Dosage | | |
|---|---|---|---|
| Permutit S-100 (Reg. TM of Permutit) | 25#/ft$^3$ | co-flow | 4 ppm Cl |
| Dowex SBR (Reg. TM of Dow Chemical) | 25#/ft$^3$ | co-flow | 13 ppm Cl (15 ppm NO$_3$) using Ca(NO$_3$)$_2$ solution |
| Permutit S-100 | 11.9#/ft$^3$ | co-flow | 26 ppm Cl |
| | 11.9#/ft$^3$ | counter-flow | 1 ppm Cl |
| | 5 #/ft$^3$ | counter-flow | 2 ppm Cl |
| Dowex SBR-P (Reg. TM of Dow Chemical) | 11.9#/ft$^3$ | co-flow | 37 ppm Cl |
| | 5 #/ft$^3$ | counter-flow | 2 ppm Cl |

By co-flow it is meant that the CaCl$_2$ solution and spent caustic regenerant enter the salt splitter from the top and by counterflow method it is meant that the CaCl$_2$ solution enters the salt splitter in a direction opposed to the spent caustic regenerant.

It is preferred that the unit be operated with counterflow regeneration. The above results show that much lower chloride leakage occurs with the counterflow method, even with relatively low regenerant dosages.

EXAMPLE II

The clear lime solutions produced in accordance with the present invention may be used substantially at once so that the problem of carbonate contamination is negligible. The only non-hydroxylic anion expected to be present is due to the originally charged anion of the soluble calcium salt.

In laboratory and field runs the following results are obtained:

| | Product | | Purity of Hydroxide |
|---|---|---|---|
| | Ca (OH)$_2$ | CaCl$_2$ | |
| Lab ($\leq$0.5 ppm Cl leakage) | 0.016Eq | 0.000014Eq | 99.9% |
| Field ($\leq$ 2 ppm Cl leakage) | 0.016 Eq | 0.000056Eq | 99.65% |

In accordance with the above procedure but utilizing calcium nitrate, or calcium sulfate as the soluble calcium salt, similar degrees of hydroxide purity are obtained.

EXAMPLE III

Field Trial Comparisons

Field trials were carried out under actual operating conditions in a commercial electric power generating plant.

In this test the lime solution utilized to displace sodium from the caustic regenerated cation exchange resin particles was, in one experiment, a conventional, filtered saturated lime solution and in the other experiment a clear lime solution prepared in accordance with the present invention.

The results were measured by two different methods:
(A) Total ion leakage over service time (i.e. usable time).
(B) Running readings of sodium ion concentration in the effluent as measured by the Calgon analyzer.

| | | Leakage | |
|---|---|---|---|
| Test A) | Service Time | Na | Ca |
| Old lime slurry system | 116 hrs.* | 1.23 ppb | 0.6 ppb |
| New clear lime system | 240 hrs. | 0.56 ppb | 0.15 ppb |

*At this time the exchanger had to be taken off line as the sodium leakage as shown by the Calgon analyzer had exceeded acceptable limits. The clear lime system treated exchanger was still producing acceptable quality at the end of the test period.

| Test B) Flow ca 220 gpm | |
|---|---|
| Slurry System | Clear System |
| 0–88 hrs. ca 1 ppb Na | 0–72 hrs.<1 ppb Na |
| 90 hrs. 3 ppb | 90 hrs. 2 ppb |
| 96 hrs. 6.5 ppb** | 96 hrs. 1.8 ppb |
| 104 hrs. 3 ppb$^\Delta$ | 104 hrs. 2 ppb |
| 120 hrs. 10 ppb** | 120 hrs. 1.8 ppb |
| | 240 hrs. 2 ppb |

**unacceptable
$^\Delta$flow dropped to 1600 gpm for test purposes

It should be noted that the reading levels in the two test systems while internally compatible are not necessarily externally compatible. Thus test results within Test A are comparable and test results within Test B are comparable.

While the invention has been described in connection with specific embodiments thereof, it will be understood that it is capable of further modification, and this application is intended to cover any variation, uses or adaptation of the invention. It will, therefore, be recognized that the invention is not to be considered as limited to the precise embodiments shown and described, but is to be interpreted as broadly as permitted by the appended claims.

We claim:

1. In a condensation purification process wherein the condensate is passed through a demineralizer containing a mixed bed of anion and cation exchange resin thereby to effect the removal of anions and cations from said condensate and said mixed bed is regenerated by resolving said bed into a first layer, a major portion of which comprises anion exchange resin particles and a minor portion of which comprises entrained cation exchange resin particles, and a second layer comprising cation exchange resin particles, contacting at least said first layer with aqueous sodium hydroxide to effect the regeneration thereof, afterwards contacting said first layer with lime solution to displace sodium ions with calcium ions on said entrained cation exchange resin particles, regenerating said second layer, mixing said first layer and said second layer to reform said mixed bed, The improvement comprising the sequential steps of
   (a) passing an aqueous solution of a water soluble calcium salt through a strong base anion exchange resin of substantially uniform basicity to provide an aqueous solution of calcium ions substantially free of anions other than hydroxyl,
   (b) contacting the aforesaid first layer with said solution of calcium ions substantially free of anions other than hydroxyl to displace the sodium ions on said entrained cation exchange particles with calcium.

2. The process of claim 1 wherein the strong base anion exchange resin of substantially uniform basicity is regenerated with an aqueous solution of sodium hydroxide.

3. The method of claim 2 wherein said sodium hydroxide is introduced in to the strong base anion exchange resin of substantially uniform basicity counterflow to the calcium salt solution.

4. The process of claim 1 wherein the strong base anion exchange resin of substantially uniform basicity is regenerated with a solution of substantially spent aqueous sodium hydroxide remaining after regeneration of the anion exchange resin particles in said first layer.

5. The process of claim 1 wherein the soluble calcium salt is calcium chloride.

6. The process of claim 1 wherein the soluble calcium salt is calcium nitrate.

7. The process of claim 1 wherein the soluble calcium salt is calcium sulfate.

* * * * *